United States Patent [19]

Yamamori et al.

[11] Patent Number: 4,663,227
[45] Date of Patent: May 5, 1987

[54] HYDROPHILIZED MEMBRANE OF POROUS HYDROPHOBIC MATERIAL AND PROCESS FOR PREPARING THE SAME

[75] Inventors: Hisayoshi Yamamori, Nagoya; Michio Inoue, Kasugai; Kazuto Kawashima; Hisao Tanaka, both of Nagoya, all of Japan

[73] Assignee: Mitsubishi Rayon Co., Ltd., Tokyo, Japan

[21] Appl. No.: 776,458

[22] Filed: Sep. 16, 1985

[30] Foreign Application Priority Data

Sep. 17, 1984 [JP] Japan .............................. 59-194452
Nov. 14, 1984 [JP] Japan .............................. 59-238484
Mar. 12, 1985 [JP] Japan .............................. 60-49140

[51] Int. Cl.$^4$ .............................................. B32B 7/12
[52] U.S. Cl. ............................... 428/315.7; 427/244; 428/315.5; 428/318.4; 521/54; 521/134; 521/149; 521/918

[58] Field of Search ............ 521/54, 55, 134, 149, 521/918; 427/244; 428/318.4, 315.5, 315.7

[56] References Cited

U.S. PATENT DOCUMENTS 3,508,953 4/1970 Simon et al. ..................... 521/918
3,826,674 7/1974 Schwarz ............................ 521/149
4,394,457 7/1983 Ogasa ................................. 521/54

Primary Examiner—Morton Foelak
Attorney, Agent, or Firm—Oblon, Fisher, Spivak, McClelland, & Maier

[57] ABSTRACT

A hydrophilized membrane of a porous hydrophobic material having micropores each defined by a surface at least part of which is coated with a hydrophilizing agent which is solid at about 20° C. and substantially insoluble in water. The hydrophilizing agent is preferably selected from monofatty acid esters of propylene glycol. Also disclosed are processes for hydrophilizing such porous hydrophobic membranes.

7 Claims, 2 Drawing Figures

HYDROPHILIZED MEMBRANE OF POROUS HYDROPHOBIC MATERIAL AND PROCESS FOR PREPARING THE SAME

BACKGROUND OF THE INVENTION

1. Field of Art

This invention relates to a hydrophilized membrane of a porous hydrophobic material and a process for preparing such a membrane.

In recent years, porous hydrophobic membranes made of polymer materials, such as polyethylene, polypropylene, polytetrafluoroethylene and copolymers of an olefin monomer and a fluorinated olefin monomer, have been used for water treatment applications, since they are excellent in water resisting property and resistance to chemicals and attacks by bacteria. For instance, such a membrane is used in medical facilities to obtain germ-free water and also used in a semiconductor manufacturing factory to obtain water of high purity.

Although these hydrophobic membranes are porous, water is not allowed to pass through or permeate them, if not subjected to a high pressure. Therefore, such hydrophobic membranes under consideration need to be hydrophilized to allow water to permeate them.

2. Related Art Statements

Various proposals have hitherto been made to hydrophilize such a hydrophobic membrane, including a method of treating a hydrophobic membrane with corona discharge, and a process wherein a hydrophobic membrane is processed with a strong oxidizing agent. However, the micropore structure of the membrane can be seriously affected by the corona discharge, resulting in deleterious change in structure, in addition to the disadvantage that the membrane cannot be permanently hydrophilized by the corona discharge treatment. On the other hand, processing with a strong oxidizing agent has disadvantages that the matrix hydrophobic material is seriously deteriorated by the oxidizing agent and that the oxidizing agent impregnating deep into the micropores is hardly removed therefrom.

Japanese Patent Laid-Open Publication No. 59-501049 discloses a process wherein a porous hydrophobic membrane is hydrophilized by coating the membrane with a mixture of a carbohydrate and a non-ionic ester of an organic monocarboxylic acid, such as a monoester of sorbitan and capric acid, lauric acid, myristic acid, palmitic acid and/or oleic acid. Although the hydrophobic membrane is hydrophilized by this process, the membrane prepared therethrough has a strong odor to make it undesirable to use the membrane as a filter for a water purifier for drinking use. Moreover, the water passing through the membrane processed in accordance with this preceding proposal suffers foaming or bubbling due to entrainment of the processing agent.

The method of hydrophilizing a porous hydrophobic membrane, which has been recommended as the most reliable and preferable up to date, involves the step of passing a liquid soluble in water and having a low surface tension, such as ethanol, through the pores of the membrane followed by replacing the liquid by water. With this method, so long as water is present in the pores of the hydrophobic membrane, water is allowed to pass through the pores under a relatively small pressure. However, once the water is removed from the pores so that the pores become dry either partially or entirely and are filled with air, the hydrophilized hydrophobic membrane is rendered hydrophobic again, and water is not allowed to pass through the pores unless it is not subjected to an extremely high pressure. Thus, when the hydrophobic membrane is hydrophilized with this conventional method, it must be always kept in wet condition to maintain the hydrophilic nature, leading to cumbersome maintenance problem.

OBJECTS AND SUMMARY OF THE INVENTION

It is, therefore, a primary object of this invention to provide a hydrophilized membrane of a porous hydrophobic material which exhibits a hydrophilic nature even if the pores of the membrane has been fully dried.

Another object of this invention is to provide a hydrophilized membrane of a porous hydrophobic material having at least a part of the surface and pores coated with a hydrophilizing agent which is solid at normal temperature and substantially insoluble in water.

A further object of this invention is to provide a hydrophilized membrane of a porous hydrophobic material having at least a part of the surface and pores coated with a hydrophilizing agent which is substantially not released in or entrained by the passing water to give bad odor or otherwise to deteriorate the quality of the water passing therethrough.

Yet a further object of this invention is to provide a process for preparing such a hydrophilized membrane of a porous hydrophobic material.

With the above objects in view, this invention is directed to a hydrophilized, water permeable, microporous membrane made of a hydrophobic material, said membrane having micropores therethrough, and said membrane having at least a portion of the surfaces thereof coated with a hydrophilizing agent which is solid at about 20° C. and substantially insoluble in water.

In a preferred embodiment, the hydrophilizing agent is a monoester of propylene glycol and a higher saturated fatty acid having 12 to 22 carbon atoms (preferably 14 to 22 carbon atoms), such as lauric acid, myristic acid, palmitic acid, stearic acid and behenic acid.

One process for hydrophilizing a microporous hydrophobic membrane, according to this invention, comprises:

(a) dipping said microporous membrane of said hydrophobic polymer material into a solution of a hydrophilizing agent which is solid at about 20° C. and substantially insoluble in water to allow said hydrophilizing agent to adhere onto at least a portion of the surface of the membrane;

(b) removing said microporous membrane of said hydrophobic polymer material from said solution and evaporating the solvent for said hydrophilizing agent; and (c) heating said microporous membrane to a temperature lower than the temperature of thermal shrinkage that the said hydrophobic polymer material starts to shrink thermally and not lower than the temperature which is lower by 10° C. from the melting point of said hydrophilizing agent.

Another process for hydrophilizing a microporous hydrophobic membrane, according to this invention, comprises:

(a) melting a hydrophilizing agent which is solid at about 20° C. and substantially insoluble in water to form a molten mass of said hydrophilizing agent; and (b) applying said molten mass of said hydrophilizing onto at least a portion of the surface of the membrane.

DESCRIPTION OF THE DRAWING

Systems used for the practice of the process of the invention are schematically shown in the appended drawing in which.

DESCRIPTION OF THE PREFERRED EMBODIMENTS

Figure 1:
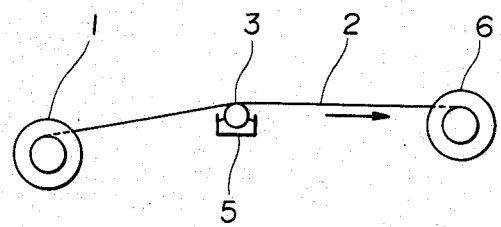
FIG. 1 is a diagrammatical view of one embodiment of the usable system.

Any kinds of porous hydrophobic membranes having micropores may be used as the matrix hydrophobic membrane for the hydrophilized membrane according to the present invention. Examples of the material for the hydrophobic membrane include polyolefins, such as polyethylene, polypropylene and poly-4-methylpentene-1, fluorine-contained polymers such as polyvinylidene fluoride, polytetrafluoroethylene, and copolymers of hexafluoroethylene and tetrafluoroethylene, and copolymers of a fluorinated olefin monomer and an olefin monomer. The porous membrane may have a shape of hollow fiber or may be molded to have a tubular or film shape.

A porous hydrophobic membrane may be prepared by molding a film or hollow fiber from a molten mass of a selected hydrophobic polymer material followed by elongation at a relatively low temperature to provide micropores at the interstices of crystallized lamellae, or by molding a membrane from a mixture composed of a first moldable material which is soluble in a certain solvent and a second moldable hydrophobic polymer material which is insoluble in the solvent followed by extraction of the first moldable material with the solvent.

It is desirous that the hydrophobic membrane has a porosity ranging within 20 to 90 vol %. If the porosity is less than 20 vol %, the water permeability of the product hydrophilized membrane becomes too low for practical uses. On the contrary, if the porosity is more than 90 vol %, the mechanical strength of the membrane is lowered significantly to lose the integrity of the product hydrophilized membrane.

The porous hydrophobic membrane is then treated with a hydrophilizing agent so that the surfaces and pores thereof are at least partially coated with a hydrophilizing agent which is solid at about 20° C. and substantially insoluble in water. The expression "substantially insoluble in water" as herein used throughout the specification and claims means that the hydrophilizing agent has a solubility in water of not more than 0.02% within the temperature range at which the finished product is used. It is essential that the hydrophilizing agent is solid at a room temperature or the temperature at which the product membrane is used, and that the hydrophilizing agent has a melting point significantly lower than the melting point and softening point of the combined hydrophobic membrane material.

It is not essential that the surfaces and pores of the matrix hydrophobic membrane should be coated with the hydrophylizing agent entirely. It has been empirically found that the merit of the invention may be obtained by coating not less than 10% of the surface areas of pores with the hydrophilizing agent of the invention. Preferably not less than 30% and more preferably not less than 50% of the surface areas of pores are covered or coated with the hydrophilizing agent. Of course, the most favorable result is obtainable when the surfaces and surface areas of pores are coated with the hydrophilizing agent in their entireties.

The hydrophilizing agent which may be preferably used in the present invention has excellent affinity or compatibility with the combined hydrophobic material for the porous membrane, and is soluble in a solvent having a low boiling point, such as ethanol. Examples of preferable hydrophilizing agent are propylene glycol mono saturated fatty acid esters, such as a monoester of propylene glycol and a higher saturated fatty acid having 12 to 22 carbon atoms. Specific examples of preferred hydrophilizing agent include propylene glycol monolaurate, propylene glycol monomyristate, propylene glycol monopalmitate, propylene glycol monostearate and propylene glycol monobehenate. The most preferable hydrophilizing agent is propylene glycol monostearate. These hydrophilizing agent may be used singly or in combination.

In preparation of the hydrophilized, microporous membrane of a hydrophobic material, according to the invention, matrix microporous membrane of a hydrophobic material is immersed in a solution of a hydrophilizing agent in a solvent having low boiling point, such as ethanol, to allow the hydrophilizing agent to be impregnated in the pores of the membrane. The membrane is then removed from the solution, and the solvent is evaporated off. The concentration of the hydrophilizing agent contained in the treating solution ranges preferably from about 0.5 to 10%. The solvent may contain water in an amount of not more than 30%, as far as the hydrophilizing agent is uniformly dissolved in the solvent mixed with water. The amount of the hydrophilizing agent adhering to the membrane ranges generally from 1 to 100%, preferably from 10 to 30%, based on the weight of the hydrophobic membrane.

Although the matrix hydrophobic membrane may be hydrophilized to form a hydrophilized membrane which can be used as a satisfactory filter module by the simple immersion-and-evaporation process as aforementioned, it is preferred that the membrane coated with the hydrophilizing agent is then subjected to a thermal treatment. The thermal treatment is effected by heating the membrane to a temperature lower than the temperature at which the membrane starts to shrink thermally and lower than the softening point of the hydrophobic material forming the matrix porous membrane and not lower than the temperature that is lower by 10° C. from the melting point of the used hydrophilizing agent.

The hydrophilic nature of the finished product membrane is considerably improved by the thermal treatment. Although it is preferred that the thermal treatment is effected at a temperature higher than the melting point of the used hydrophilizing agent, it suffices that the thermal treatment temperature is not lower than the temperature that is lower by 10° C. from the melting point of the used hydrophilizing agent, as described hereinbefore. The reason for such an improvement in hydrophilic nature by the thermal treatment has not been clarified. However, the following hypothesis has been built up empirically. In the condition where the hydrophilizing agent is simply coated on the surfaces of the pores and has not been subjected to thermal treatment, the molecules of hydrophilizing agent are oriented randomly with the hydrophobic groups or ends of some molecules facing to the hydrophobic membrane while the hydrophilic groups or ends of other molecules facing to the hydrophobic membrane. During the thermal treatment effected at a temperature within the defined range, major portion of the hydrophilizing agent molecules is rearranged so that the hydrophobic groups or ends thereof face to the hydrophobic membrane with the hydrophilic groups or ends being exposed to the exterior surfaces. As a result of such rearrangement or re-orientation, the hydrophilic nature of the membrane after the thermal treatment is improved. This hypothesis has been supported by the following results of experiments conducted for the determination of wetting rate.

Wetting Rate Determination Experiment

A polyethylene membrane having cleaned surfaces was immersed in a both containing a 5 wt % propylene glycol monostearate (Melting Point: 45° C.) in ethyl alcohol for about 3 minutes. After removing from the bath, the membrane was separated into two pieces. One piece was allowed to stand in a thermostatic chamber maintained at 20° C. for 2 days to remove ethyl alcohol by spontaneous air drying to prepare a first sample which was not subjected to thermal treatment. The other cut piece was held in a hot air drier maintained at 50° C. for about an hour to remove ethyl alcohol and subjected to thermal treatment concurrently, whereby a second sample subjected to thermal treatment was prepared. First and second samples and a control polyethylene film which had not been immersed in the above mentioned bath were wetted by dripping water thereon. It was observed that the water drop was immediately dispersed and the surface was uniformly wetted on the second sample which had been subjected to thermal treatment. The wetting rate of the first sample is relatively low on the surface of the first sample which had been simply coated with the hydrophilizing agent and not subjected to thermal treatment, although the contact angle was considerably smaller than that on the surface of the control polyethylene film which had not been coated with the hydrophilizing agent.

It was surprising that a remarkable improvement in hydrophilic nature was attained by treating the hydrophobic membrane with the hydrophilizing agent of the invention, irrespective of the fact that the hydrophilizing agent used in the invention is a non-ionic surfactant having a relatively low HLB value. This remarkable improvement is partly attributed to the thermal treatment conducted at a temperature approximate to the softening point or approximate to the pre-melt temperature of the hydrophilizing agent. Preferably, the thermal treatment is effected at a temperature within a range below the temperature that is higher by 20° C. from the melting point of the hydrophilizing agent. It suffices that the thermal treatment is effected by heating the membrane coated with the hydrophilizing agent at a selected temperature for about an hour.

According to a further aspect of the invention, the microporous membrane made of a hydrophobic material is hydrophilized by a process comprising the step of applying a molten hydrophilizing agent at least a portion of the surfaces of micropores of a hydrophobic membrane. The amount of the hydrophilizing agent applied on the membrane ranges such that a monomolecular layer is applied over the surfaces and the pore surfaces of the membrane, the preferable amount being within 1 to 100 wt %, preferably 10 to 30 wt %, based on the weight of the matrix membrane.

The hydrophilizing agent is melted and the molten hydrophilizing agent is then applied on the hydrophobic membrane. In application of the molten hydrophilizing agent, any conventional systems, including the dip-nip system, funnel system, nozzle spray system, gravure roller coating system and roller coating system, may be employed. The amount of the hydrophilizing agent adhering onto the hydrophobic membrane is varied depending on the viscosity of the molten mass and the application method employed. Accordingly, it is desirous that the application system or method is selected in consideration of the viscosity of the molten hydrophilizing agent used. The dip-nip system and the funnel system are suited for applying a molten hydrophilizing agent having a relatively high viscosity, whereas the nozzle spray system and the roller costing system are suited for applying a molten hydrophilizing agent having a relatively low viscosity. In case where the dip-nip system is used, it is preferred that a soft touch squeezer is used so that a thin layer is applied over the matrix membrane.

An embodiment of the coating system used for applying a molten hydrophilizing agent onto a hydrophobic membrane will now be described with reference to the drawing.

Referring to FIG. 1, a porous membrane 2 made of a hydrophobic material is drawn from a feed bobbin 1 to contact with a heated roller 3, and then taken up around a take-up bobbin 6. The surface of the roller 3 is applied with a thin film of a molten hydrophilizing agent contained in a container 5 provided with heating means. Upon contact with the roller 3, the porous membrane 2 is coated with a thin film of the molten hydrophilizing agent which is cooled to a temperature below the melting point of the hydrophilizing agent to be solidified before the membrane 2 is taken up around the take-up bobbin 6.

Figure 2:
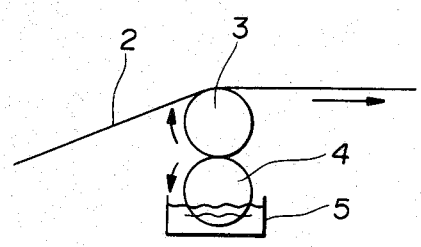
FIG. 2 is a diagrammatical view of another embodiment of the system.

In the system shown in FIG. 2, a pair of rollers 3 and 4 is used to uniformalize the molten hydrophilizing agent layer, similarly as in a conventional gravure printing system. The hydrophilizing agent is put into the container 5 where it is heated to a pre-set temperature to form a molten mass. The heated roller 3 or 4 has a peripheral portion dipped in the molten mass and rotated at a predetermined speed, so that a thin film of the molten hydrophilizing agent is entrained by the roller 3 or 4. Upon contact with the moving membrane 2, the thin film of the molten hydrophilizing agent is taken up by the membrane to cover the surface thereof.

Irrespective of either of the systems shown in FIGS. 1 and 2 is used, the amount of the hydrophilizing agent adhering onto the surface of the membrane 2 is controlled by changing the transfer speed of the membrane 2 and by changing the circumferential speed of the coating roller 3 or 4. The coating roller 3 or 4 may have an aventurine surface to prevent the membrane 2 from winding around the coating roller.

It is again preferable to heat the membrane applied with the hydrophilizing agent to a temperature above the melting point of the hydrophilizing agent so that the hydrophilizing agent impregnates deep into a lot of micropores.

EXAMPLES

In order that the invention can be more clearly understood, preferred examples thereof will now be described.

EXAMPLE 1

A liquid treatment device comprising a hollow housing having at least an inlet port for a liquid to be treated and at least one outlet for the liquid permeated was prepared. Such a device will be hereinafter referred to as a module, and a U shaped bundle of hollow fibers is disposed within the housing will the ends thereof being in liquid communication with the inlet port.

In this Example, each hollow fiber was made of a microporous polyethylene membrane and had an internal diameter of 300 microns, a thickness of 70 microns and a porosity of 65%. The microporous polyethylene membrane was immersed in a 2 wt % solution of propylene glycol monostearate in ethanol at the room temperature for 5 minutes. After removing the membrane from the solution, it was dried under a reduced pressure for 14 hours in a vacuum drier maintained at 50° C. It was found that the thus treated membrane had propylene glycol monostearate in an amount of 15 wt % of the untreated porous membrane. It was also found that more than about 95% of the surface area of the membrane was covered by a propylene glycol monostearate layer.

A water filtering module was manufactured by assembling the thus treated membrane with the aforementioned module so that the hollow fibers had a total membrane area of 0.6 m$^2$. The water filtering module was connected to a spout of city water, and water was filtered therethrough at a water pressure of 0.5 kg/cm$^2$ to find that the water permeability was 10.5 liter/min. After passing 20 liter of water through the module, water contained in the module was removed and the module was then dried at 50° C. at a reduced pressure for 24 hours. After the completion of removal of water, the once dried water filtering module was again connected to the spout of city water and water was filtered therethrough under the same condition. At that time, the water permeability of the module or fiber was 10.5 liter/min. The filtered water had not odd odor when it was drank.

COMPARATIVE EXAMPLE 1

Using the same bundle of hollow fibers made of the same microporous polyethylene membrane, but not being coated with the propylene glycol monostearate, a water filtering module having a total membrane area of 0.6 m$^2$ was prepared. The module was hydrophilized by flowing an aqueous ethanol (70 wt % of ethanol) therethrough, and then rinsed with water. Water was passed through the thus prepared comparative module under the same condition as in Example 1 to find that the water permeability was 9.8 liter/min. After passing 20 liter of water through the module, water contained in the module was removed and the module was then dried under the same condition as in Example 1. Water was again passed through the thus dried comparative module under the same condition to find that no water permeated each fiber. The water pressure was then raised to 2 kg/cm$^2$, but water could not pass through the membrane.

EXAMPLE 2

The same liquid treatment device or module and the same hydrophobic membrane as used in Example 1 were used in this Example.

The microporous polyethylene membrane was immersed in a 5 wt % solution of propylene glycol monostearate in ethanol at the room temperature for 5 minutes. After removing the membrane from the solution, it was dried under a reduced pressure for about 10 hours in a vacuum drier maintained at 60° C. It was found that the thus treated membrane had propylene glycol monostearate in an amount of 15.8 wt % of the untreated porous membrane. It was found that more than about 95% of the surface area of the membrane was covered by a propylene glycol monostearate film.

A water filtering module was manufactured by assembling the thus treated membrane with the aforementioned module so that the hollow fibers had a total membrane area of 0.6 m$^2$. The water filtering module was connected to a spout of city water, and water was filtered therethrough at a water pressure of 0.5 kg/cm$^2$ to find that the water permeability was 11.0 liter/min. After passing 20 liter of water through the module, water contained in the module was removed and the module was then dried at 60° C. at a reduced pressure for 24 hours. After the completion of removal of water, the once dried water filtering module was again connected to the spout of city water and water was filtered therethrough under the same condition. At that time, the water permeability of the module or fiber was 11.0 liter/min.

EXAMPLE 3

The same liquid treatment device or module and the same matrix hydrophobic membrane as used in Example 1 were used in this Example.

The microporous polyethylene membrane was immersed in a 5 wt % solution of propylene glycol monostearate in ethanol at the room temperature for 5 minutes. After removing the membrane from the solution, it was dried under a reduced pressure for about 150 hours in a vacuum drier maintained at 35° C. It was found that the thus treated membrane had propylene glycol monostearate in an amount of 16.4 wt % of the untreated porous membrane. It was found that more than about 95% of the surface area of the membrane was covered by a propylene glycol monostearate layer.

A water filtering module was manufactured by assembling the thus treated membrane with the aforementioned module so that the hollow fibers had a total membrane area of 0.6 m$^2$. The water filtering module was connected to a spout of city water, and water was filtered therethrough at a water pressure of 0.5 kg/cm$^2$ to find that the water permeability was 8.7 liter/min. After passing 20 liter of water through the module, water contained in the module was removed and the module was then dried at 60° C. at a reduced pressure for 24 hours. After the completion of removal of water, the once dried water filtering module was again connected to the spout of city water and water was filtered therethrough under the same condition. At that time, the water permeability of the module was 8.7 liter/min.

EXAMPLE 4

The same liquid treatment device or module and the same matrix hydrophobic membrane as used in Example 1 were used in this Example.

The microporous polyethylene membrane was immersed in a 5 wt % solution of propylene glycol monostearate in ethanol at the room temperature for 5 minutes. After removing the membrane from the solution, it was dried by air in a thermostat maintained at 20° C. for about 70 hours to remove ethanol completely. It was found that the thus treated membrane had propylene glycol monostearate in an amount of 16.4 wt % of the untreated porous membrane. It was found that more than about 95% of the surface area of the membrane was covered by a propylene glycol monostearate layer.

A water filtering module was manufactured by incorporating thus treated membrane into the aforementioned module so that the hollow fibers had a total membrane area of 0.6 m$^2$. Water was passed through the filtering module under the same condition as in Example 1 to find that the water permeability of the module was 3.2 liter/min.

As will been seen by comparing the results of Examples 1 to 4 with the result of Comparative Example 1, the water permeability of a matrix hydrophobic membrane can be remarkedly improved by the application of the hydrophilizing agent of the invention. On the other hand, comparing the results of Examples 1 to 3 with the result of Example 4, it should be appreciated that the hydrophilic nature of the membrane can be further improved by subjecting the membrane applied with the hydrophilizing agent of the invention to thermal treatment.

EXAMPLE 5

Prepared was a bundle of fibers made of a porous polyethylene membrane produced and sold under the Trade Name of EHF-390C from Mitsubishi Rayon Company, Limited. Each hollow fiber had an internal diameter of 270 microns and an external diameter of 390 microns. The matrix hydrophobic membrane was hydrophilized using the system shown in FIG. 1. Propylene glycol monostearate having a melting point of 45° C. was used as the hydrophilizing agent according to the invention, and contained in the container 5 maintained at 65° C. Feed rate of the fibers was set to 10 m/min and the circumferential speed of the coating roller 3 was set to 3 m/min. The thus prepared bundle of hollow fibers made of the hydrophilized membrane took up 19.3% of the hydrophilizing agent. 2880 hollow fibers were bundled and assembled in the housing of the same module as used in Example 1 with the ends of the fiber bundle being fixed by an urethane resin. The effective membrane area of the module was 0.6 m$^2$.

Thus obtained module was used to filter city water in Nagoya-shi to obtain the initial flux characteristics and the flux characteristics after passing 5 tons of water therethrough, as shown in the following Table.

TABLE

| Flux (liter/min) at Water Pressure of 0.7 kg/cm$^2$ | |
| --- | --- |
| Initial Stage | After Passing 5 tons of Water |
| 4.8 liter/min | 2.5 liter/min |

In contrast thereto, the module of Example 5 was stained evenly and was kept in the condition adapted for further passage of water.

EXAMPLE 6

The same liquid treatment device or module and the same matrix hydrophobic membrane as used in Example 1 were used in this Example.

In this Example, each hollow fiber was made of a microporous polypropyrene membrane and had an internal diameter of 200 microns, a thickness of 25 microns and a porosity of 45%. The microporous polypropyrene membrane was immersed in a 5 wt % solution of propylene glycol monostearate in ethanol at the room temperature for 10 minutes. After removing the membrane from the solution, it was dried under a reduced pressure for 14 hours in a vacuum drier maintained at 60° C. It was found that the thus treated membrane had propylene glycol monostearate in an amount of 17 wt % of the untreated porous membrane. It was also found that more than about 80% of the surface area of the membrane was covered by a propylene glycol monostearate layer.

A water filtering module was manufactured by assembling the thus treated membrane with the aforementioned module so that the hollow fibers had a total membrane area of 0.6 m$^2$. The water filtering module was connected to a spout of city water, and water was filtered therethrough at a water pressure of 0.5 kg/cm$^2$ to find that the water permeability was 1.1 liter/min. After passing 5 liter of water through the module, water contained in the module was removed and the module was then dried at 50° C. at a reduced pressure for 24 hours. After the completion of removal of water, the once dried water filtering module was again connected to the spout of city water and water was filtered therethrough under the same condition. At that time, the water permeability of the module or fiber was 1.1 liter/min.

What is claimed is:

1. A hydrophilized, water-permeable, microporous membrane made of a hydrophobic material selected from the group consisting of polyethylene, polypropylene, poly-4-methylpentene-1, polyvinylidenefluoride, polytetrafluoropropylene, copolymers of hexafluoropropylene and tetrafluoropropylene, and copolymers of a fluorinated olefin monomer and an olefin monomer; said membrane having a porosity of 20–90 volume percent, and said membrane having not less than 10% of the surface area of the pores thereof coated with from 1–100% by weight of a hydrophilizing agent based on the weight of the hydrophobic membrane, said agent being a monoester of propylene glycol and a saturated fatty acid having 12–22 carbon atoms which is solid at about 20° C. and substantially insoluble in water.

2. The membrane according to claim 1, wherein said fatty acid is selected from the group consisting of lauric acid, myristic acid, palmitic acid, stearic acid and behenic acid.

3. The membrane according to claim 2, wherein said propylene glycol monofatty acid ester is propylene glycol monostearate.

4. The membrane according to claim 1, wherein said propylene glycol monofatty acid ester is a monoester of propylene glycol and a saturated fatty acid having 14–22 carbon atoms.

5. The membrane according to claim 1, wherein not less than 30% of the surface area of the pores is covered or coated with said hydrophilizing agent.

6. The membrane according to claim 5, wherein not less than 50% of the surface area of the pores is covered or coated with said hydrophilizing agent.

7. The membrane according to claim 1, wherein the surface area of the pores is covered or coated in the entirety with said hydrophilizing agent.

* * * * *